(12) United States Patent
Diemer et al.

(10) Patent No.: US 8,245,853 B2
(45) Date of Patent: Aug. 21, 2012

(54) FILTER MODULE

(75) Inventors: Wolfgang Diemer, Waldstetten (DE); Martin Zeiler, Schwäbisch (DE); Dieter Mohn, Berlin (DE); Klaus Feifel, Schwäbisch Gmünd (DE)

(73) Assignee: Pall Corporation, Port Washington, NY (US)

( * ) Notice: Subject to any disclaimer, the term of this patent is extended or adjusted under 35 U.S.C. 154(b) by 353 days.

(21) Appl. No.: 12/526,536

(22) PCT Filed: Feb. 1, 2008

(86) PCT No.: PCT/EP2008/000806
§ 371 (c)(1),
(2), (4) Date: Dec. 9, 2009

(87) PCT Pub. No.: WO2008/098690
PCT Pub. Date: Aug. 21, 2008

(65) Prior Publication Data
US 2010/0089814 A1   Apr. 15, 2010

Related U.S. Application Data

(60) Provisional application No. 60/889,758, filed on Feb. 14, 2007.

(51) Int. Cl.
*B01D 27/00*   (2006.01)
*B01D 29/07*   (2006.01)
*B01D 35/28*   (2006.01)

(52) U.S. Cl. ............... 210/494.1; 210/494.3; 210/497.1; 210/435; 210/437; 210/457

(58) Field of Classification Search ........................ None
See application file for complete search history.

(56) References Cited

U.S. PATENT DOCUMENTS

| | | | |
|---|---|---|---|
| 2,173,978 A |   | 9/1939 | Pennebaker |
| 2,339,703 A | * | 1/1944 | Kamrath ................. 210/457 |
| 2,816,665 A |   | 12/1957 | Layte et al. |
| 5,164,085 A | * | 11/1992 | Spokoiny et al. ....... 210/256 |

(Continued)

FOREIGN PATENT DOCUMENTS
DE     197 05 856     9/1998
(Continued)

OTHER PUBLICATIONS

U.S. Appl. No. 12/526,533, filed Aug. 10, 2009.
(Continued)

*Primary Examiner* — Benjamin Kurtz
(74) *Attorney, Agent, or Firm* — Leydig, Voit & Mayer, Ltd.

(57) ABSTRACT

The present invention relates to a filter module comprising a body of wound layers of sheet material, with an inner and outer peripheral surface, a winding axis and a passage within the body, the sheet material having a plurality of openings forming at least two types of channels within the wound layers, the channels extending in a direction from the inner peripheral surface to the outer peripheral surface, a first type of channels in fluid communication with the outer periphery and closed at the end toward the inner periphery, a second type of channels in fluid communication with the inner periphery and closed at the end toward the outer periphery, the two types of channels separated by portions of sheet material, one of the types of channels being outlet channels and being covered by a filter material.

17 Claims, 4 Drawing Sheets

U.S. PATENT DOCUMENTS

| | | | |
|---|---|---|---|
| 5,232,595 | A | 8/1993 | Meyer |
| 5,520,801 | A | 5/1996 | Gerber et al. |
| 6,391,193 | B1 | 5/2002 | Luka |
| 2004/0035783 | A1 | 2/2004 | Strohm et al. |
| 2005/0155923 | A1* | 7/2005 | Diemer et al. ............ 210/345 |
| 2008/0142449 | A1 | 6/2008 | Diemer et al. |
| 2008/0169234 | A1 | 7/2008 | Diemer et al. |
| 2008/0223781 | A1 | 9/2008 | Diemer et al. |
| 2008/0230470 | A1 | 9/2008 | Diemer et al. |

FOREIGN PATENT DOCUMENTS

| | | |
|---|---|---|
| DE | 197 52 376 | 5/1999 |
| DE | 299 10 958 | 10/1999 |
| DE | 198 48 389 | 5/2000 |
| DE | 101 50 273 | 4/2003 |
| EP | 0 635 296 | 1/1995 |
| EP | 1 035 901 | 9/2000 |
| EP | 1 165 204 | 1/2002 |
| WO | WO 99/47234 | 9/1999 |
| WO | WO 02/053257 | 7/2002 |
| WO | WO 03/033101 | 4/2003 |
| WO | WO 03/041829 | 5/2003 |
| WO | WO 2008/098688 | 8/2008 |
| WO | WO 2008/098689 | 8/2008 |

OTHER PUBLICATIONS

U.S. Appl. No. 12/526,539, filed Aug. 10, 2009.

* cited by examiner

FILTER MODULE

FIELD OF THE INVENTION

The present invention relates to a filter module useful in fluid processing applications, especially in multistep filtration applications, especially of liquids, e.g., beverages or food oils.

BACKGROUND OF THE INVENTION

In many fluid processing applications, production and cleaning processes, different process steps are required.

Furthermore, the capacity of a module, especially in filtration applications may be not used up to its full extent for fear of contamination of the filtrate in case of a break through of the filtration application.

Consequently, the filter modules have to be replaced prematurely before their maximum capacity has been exploited for the afore-mentioned safety reasons.

SUMMARY OF THE INVENTION

In order to provide an efficient module which allows the maximum use of the module in filtration application and which furthermore provides flexibility in the use of the module for a number of fluid processing applications in general, the present invention proposes a module according to claim 1.

The present invention uses the technique of providing a body of wound layers of a sheet material, the sheet material comprising openings to form channels which may form inlet and/or outlet channels.

This technology of forming a module for filtration or processing fluids in general provides a versatile means for adapting the module to the various needs of different fluid processing applications including filtration applications.

The specific advantage of the present invention results from a filtration material covering one end of the outlet channels (which may be called open ends) but nevertheless providing fluid communication from the outlet channels to the periphery of the module. Because of the filter material covering the open ends of the outlet channels, the module may be used, for example, in filtration applications to its full capacity and a break through of the non-filtrate into the outlet channels would not lead to a contamination of the filtrate but the fluid will have to pass through the filter material covering the open ends of the outlet channels, thus being filtered prior to reach the periphery of the module and the previously collected filtrate.

The filtration capacity of the filter material covering the open ends of the outlet channels need not to be very high and, because of the typically relatively small surface area provided at the open ends of the outlet channels, in case of a break through the $\Delta p$ of the filtration process or the $\Delta p$ measured over the module as such will increase rapidly, providing an unmistakable indicia for the end of the service life of the module.

In addition, during normal operation of the module, depending on the filtration characteristic of the filter material covering the open ends of the outlet channels an additional turbidity reduction may be achieved which may be above 90%, preferably above 95%, whereas the additional pressure drop over the filtration module remains negligible.

The safety function of the filter material covering the open ends of the outlet channels may be customized to the individual filtration application or fluid processing application in general, in that, e.g., a specific sheet material is used as the filter material to cover the open ends of the outlet channels.

Specifically the filter material covering the open ends of the outlet channels may be designed to provide or maintain microbiological safety.

It is noted that it is within the scope of the present invention that the outlet channels may open to the inner periphery of the body of wound layers or likewise be arranged to open towards the outer periphery of the body of wound layers.

In filtration applications, the main filtration will occur once the fluid to be filtered enters the inlet channels and migrates through the sheet material and is collected in the outlet channels. During this filtration stage, the fluid flow is essentially parallel to the surfaces of the layers of the sheet material and, depending on the nature of the sheet material, may of course migrate right through the substance of the sheet material itself.

The fluid flow during the filtration step which occurs when the filtered fluid passes through the filter material provided to cover the open ends of the outlet channels is of a different type since the fluid then passes in a so called standard flow direction (in radial direction) of the body and perpendicular to the surface of the filter material through this filter material and reaches the periphery (inner or outer periphery, respectively) of the body of wound layers.

In addition, the filter material covering the open ends of the outlet channels provide a safety measure against a break through or bypass of the system which may occur if a pressure difference from inlet to outlet channels exceeds a maximum tolerable value. In summary, the filter material used to cover the open ends of the outlet channels of the body of wound layers not only contributes to enhanced safety in operation of the module but in addition provides for improved filtration results.

The filter material to cover the open end of the outlet channels may be constituted by one or more layers of the body of wound sheet material and the sheet material indeed may be the same one as used to constitute the body of wound layers as a whole.

The filter characteristics of the filter material to cover the open ends of the outlet channels may be modified in that, for example, the compression of the filter material is made higher in the portion which covers the open ends of the outlet channels so that very fine particles which usually would not be captured during the filtration operation of the module may be captured when the fluid is passing through this portion of filter material.

In another embodiment, the one or more layers of the body adjacent to the outer or inner periphery which provides for the filter material covering the open ends of the outlet channels may be manufactured from a sheet material which is different from the sheet material used to build the rest of the body of wound layers of the module. Here, in addition, a broad variety of filter material may be used, depending on the filtration or processing application for which the module is designed.

In one preferred embodiment of the present invention, the one or more layers of filter material adjacent to the inner or outer periphery of the body to cover the open ends of the outlet channels may include a layer of a microporous membrane. The capacity of such microporous membranes is rather small, so it would provide more or less a safety function only.

In another preferred embodiment, said one or more layers adjacent to the inner or outer periphery to cover the open ends of the outlet channels may comprise a layer of pleated filter sheet material. In this case, the capacity of the filter material covering the open ends of the outlet channels is much higher and may be designed capacity wise to fit the needs of a specific filtration application.

When the pressure drop across the filter material covering the open ends of the outlet channels should be as small as possible and/or the filtration capacity thereof is to be increased, a drainage layer may be positioned in between the one or more layers of filter material and the subsequent windings of sheet material constituting the rest of the body.

The drainage material, e.g., a mesh or net structure may provide access for the fluid collected in the outlet channels to essentially all of the surface of the innermost layer of the filter material.

The filtration effect is then no more restricted to the areas of the filter material covering the opening of the outlet channels forming the open ends thereof.

In another embodiment of the present invention, the sheet material making up for the body of wound layers of the module according to the present invention comprises openings which form a third type of channels. This type of channels has closed ends towards the inner periphery as well as towards the outer periphery and is accessible for the fluid only by penetrating the body of wound layers and is not in direct fluid communication with the outer periphery nor the inner periphery of the module. The fluid flow obtained in such type of modules includes a fluid flow from the inlet channels through a portion of the body of wound layers into the third type of channels where the fluid is collected prior to passing it on to the outlet channels of the body.

The third type of channels may accommodate a particulate treatment material. In view of the fact that the open ends of the outlet channels are covered by filter material, the outlet channels also provide for a volume which may be used to accommodate particulate treatment material independent of the presence of third type channels.

Preferable particulate treatment material is selected from filter aids, reactive agents in general, absorptive agents, adsorptive agents, ion exchange materials and/or catalytic agents.

In many cases, the sheet material used for forming the body of wound layers will be a depth filter material. It is pointed out that it is not mandatory to use a depth filter material to build the body of wound layers but it also could be sort of fluid impervious material to build the body of wound layers and still a filtration effect would result since the fluid then would have to penetrate the portion of the body of wound layers through the gaps existing between consecutive layers of sheet material. Such fluid impervious sheet material could be, for example, polymer films or metal sheets.

In order to make it possible to further adapt the filter module to a specific application, it is preferred that the sheet material comprises a matrix including a compressible material and/or a material which swells in contact with a fluid to be filtered.

This measure allows to either compress the sheet material during the winding process when the module is manufactured which ensures that the layers of sheet material are in close contact with one another and homogeneous filtration characteristic all over the body is obtained. In case the material swells in contact with the fluid, additional safety is obtained as to prevention of bypasses.

Furthermore, the sheet material used to form the body of wound layers of the module according to the present invention may comprise a matrix incorporating an additive, said additive being preferably in particulate form.

The additives to be accommodated in the matrix of the sheet material are similar to what has been proposed for the particulate material to be accommodated by the channels of the third type and/or the outlet channels.

Specific examples for such particulate materials, being it additives to the matrix of the sheet material or particulate treatment material to be accommodated in the channels of the third type and/or the outlet channels include kieselguhr, perlite, bentonite, activated carbon, zeolite, micro crystalline cellulose and PVPP.

In many applications, the sheet material will comprise a matrix wherein said matrix includes organic polymer material.

For the manufacturing of the filter module of the present invention it may be useful to have a hollow support member to provide support for the inner peripheral surface of the body of wound layers. Such a hollow support member may be in the form of a hollow shaft which is perforated so as to provide fluid communication from the open end of the inlet or outlet channels, depending on the fluid flow direction selected for the module, and the passage.

In addition, it is within the scope of the present invention to accommodate a candle type filter unit within the passage of the body of wound layers. The use of a candle type filter unit within the passage of the body of wound layers in addition increases the versatility of the module of the present invention.

In a specific embodiment, the outer surface of the candle type filter unit may even serve as a support member for the inner peripheral surface of the body of wound layers.

These and additional advantages of the present invention will be come apparent from the following description of some specific embodiments of the present invention.

DETAILED DESCRIPTION OF THE INVENTION

Figure 1:
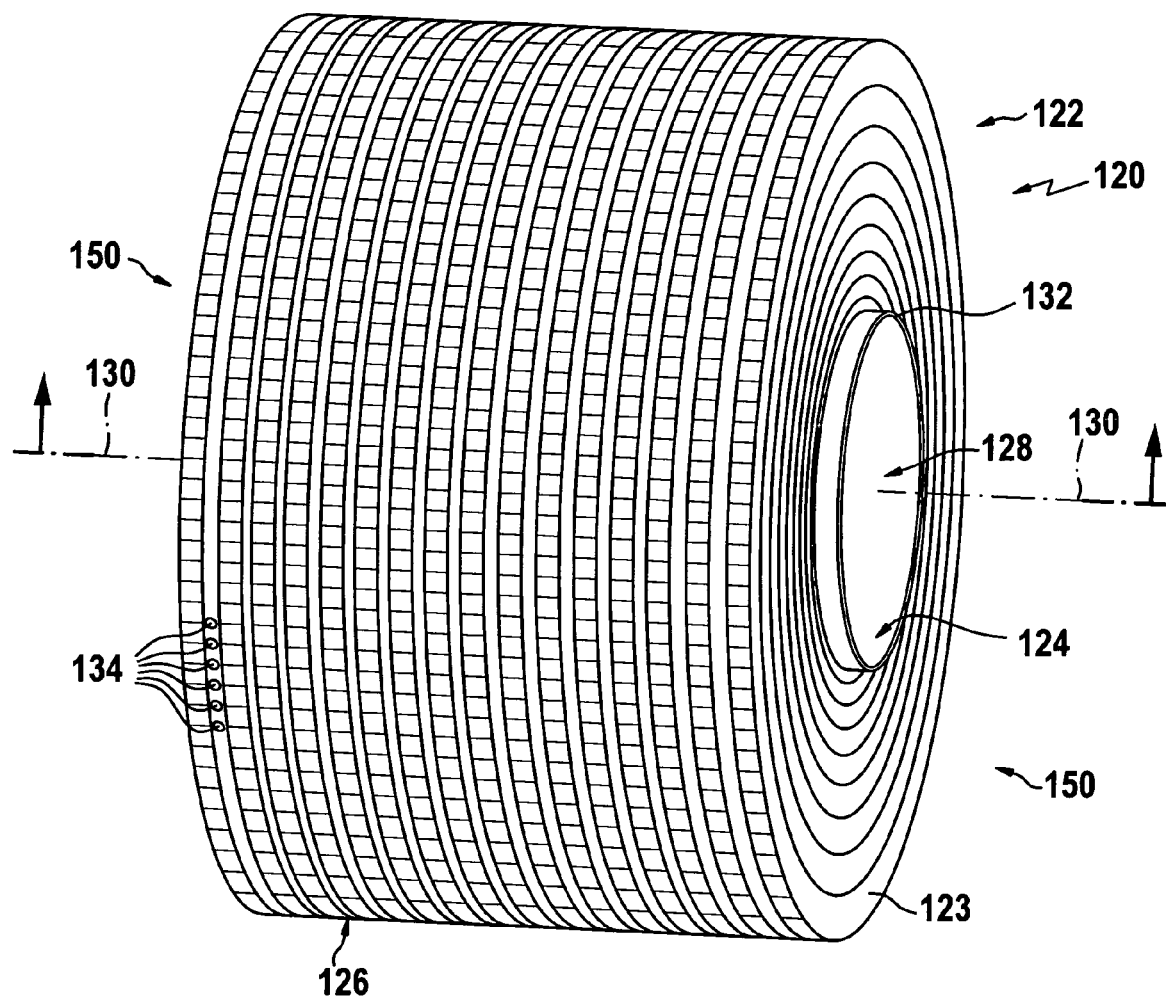
FIG. 1: a schematic representation of a filter module according to a first embodiment of the present invention.

FIG. 1 shows a filter module 120 according to a first embodiment of the present invention, comprising a body 122 of wound layers of a sheet material 123.

The body 122 of module 120 comprises an inner peripheral surface 124 and an outer peripheral surface 126 delimiting the body with respect to an inner and an outer periphery, respectively. Within the body 122 there is a passage 128 which extends through the body 122 along its winding axis 130, coextensive with the inner peripheral surface of the body. The inner peripheral surface of the body is in fluid communication with the passage which is constituted in the embodiment of FIG. 1 by a support member 132 in the form of a hollow, perforated shaft (not shown in detail in FIG. 1).

The sheet material 123 comprises a large number of openings 134 which in case of the embodiment shown in FIG. 1 are of circular shape, cooperating to form a first type of channel 136 which opens to the outer peripheral surface 126. Channels 136 generally extend in the direction from the outer to the inner peripheral surface of the body 122, i.e., in radial direction of the body.

Figure 2:
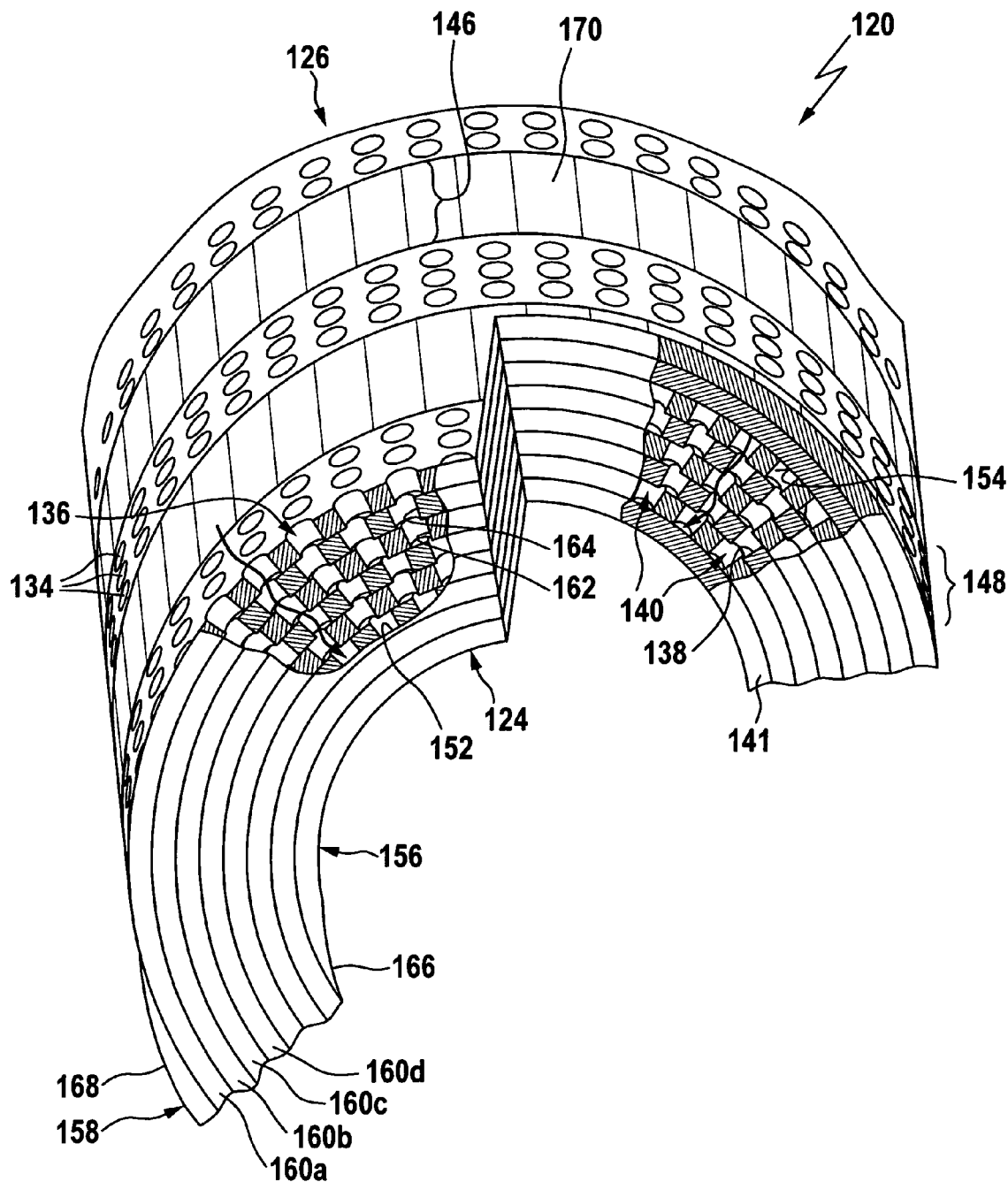
FIG. 2: a module similar to the one of FIG. 1 with part of the body cut away.

The sheet material 123 furthermore comprises a plurality of openings 138, cooperating to form a second type of channels 140 which communicate with the inner periphery of the body 122 (cf. FIG. 2). The channels 140 generally extend in radial direction from the inner to the outer peripheral surface of body 122.

For ease of reference, the first type of channels 136 will be called inlet channels, the second type of channels 140 will be called outlet channels.

Preferably, the openings 134, 138 are arranged in the sheet material 123 in parallel rows so that the inlet and outlet channels 136 and 140, are formed in separate disk shaped portions 146 and 148 of the body 122.

From FIG. 2 it is apparent that the openings 134 forming inlet channels 136, incompletely register with a corresponding opening 134 of an adjacent layer of sheet material 123.

The inlet channels 136 are closed on their ends 152, located towards the inner peripheral surface 124 of body 122 and not in communication with said passage 128. The outlet channels 140 are in fluid communication by one of their ends adjacent with the inner periphery, but are closed at their opposite ends 154 towards the outer peripheral surface 126. The one ends of the outlet channels communicating with the inner periphery are covered by a layer 141 of sheet material 123, which does, however, not close the outlet channels but maintain fluid communication with the inner periphery. It is therefore important that the layer 141 is made of a sheet material which is pervious to the fluid to be processed by module 120 in radial direction of the body, i.e., in a direction essentially perpendicular to the surface of the sheet material. Therefore, these one ends of the outlet channels may be regarded as open ends.

In order to provide this structure of channels 136 and 140 in the body 122 of the filter module 120, the sheet material 123 comprises in a first end portion 156 forming a first full winding or layer 141 of the body no openings at all. Only as of the following winding or layer openings 138 are present which contribute to forming the outlet channels 140. No openings which could contribute to forming inlet channels 136 are found in that portion 156 of sheet material 123.

At its other end portion 158, the sheet material 123 comprises openings 134 only contributing to form inlet channels 136, and in that end portion 158 no openings 138 which contribute to forming outlet channels 140 are found.

Usually, the lengths of the end portions 156 and 158 are such that the closed ends 152 and 154 of the inlet and outlet channels, respectively, are covered and shut off by at least two consecutive layers of sheet material 123 within the body 122 adjacent to the inner peripheral surface 124 and the outer peripheral surface 126, respectively.

This is usually enough to ensure that the processing, e.g., filtering characteristic of the body 122 as a whole is maintained and no fluid to be treated may bypass the sheet material and find a shortcut from the inlet of the module 120 to the outlet of the module.

It has, however, to be noted that it is within the scope of the present invention that the channels 136 which open to the outer peripheral surface 126 may function as outlet channels, whereas the channels 140 which open to the inner peripheral surface 124 than serve as inlet channels. The fluid flow would then be reversed from passage 128 into channels 140, through the body 122 of sheet material 123 optionally to the treatment channels and from there to the channels 134 collecting the filtrate and draining it to the outer peripheral surface 126. A layer or winding with no openings at all (corresponding to layer 141) will then be provided on the outer peripheral surface 126).

Figure 4:
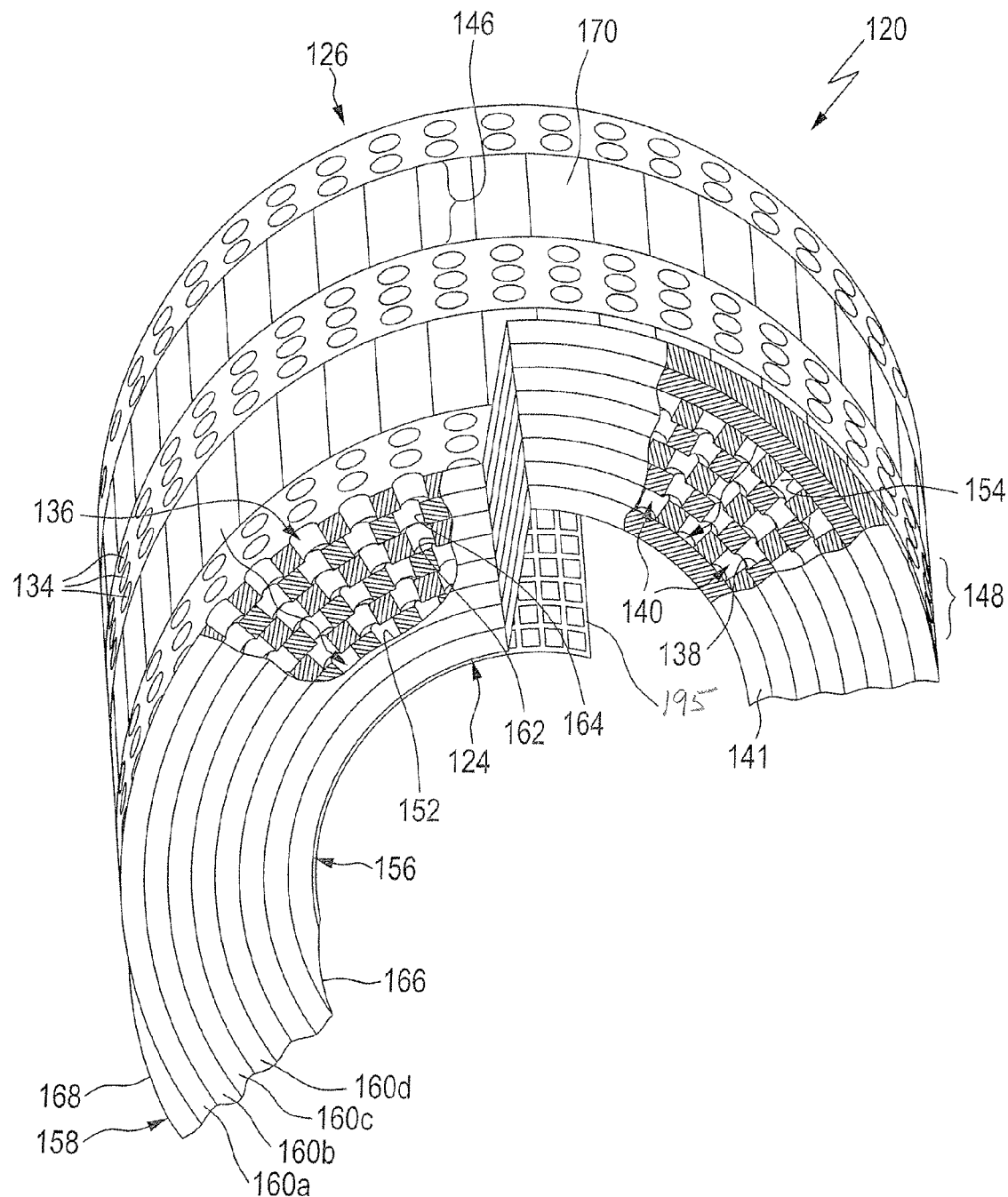
FIG. 4: a module similar to the one of FIG. 1 with part of the body cut away, and including a drainage layer.

In order to increase the filtration capacity and/or reduce the pressure drop over the filtration material covering the open ends of the outlet channels, the module may comprise a drainage layer (for example, drainage layer 195 as shown in FIG. 4) positioned in between the one or more layers of filter material covering the one end of the outlet channels and the subsequent windings of sheet material of the body. The drainage layer, which may have a mesh or net like structure (as shown in FIG. 4), provides a distribution of the fluid from the outlet channels to more or less completely all surface area of the filtration material from where it then passes in radial direction through the one or more layers thereof.

As mentioned before, FIG. 2 shows the openings 134 of adjacent layers 160a, 160b, 160c and 160d incompletely register such that the surface of inlet channel 136 does not show a smooth tubular surface but comprises the plurality of recesses 162 and projections 164, respectively, increasing the surface area of the inlet channels 136 to a great extent, thereby increasing the filter capacity and the service life of the filter module 120.

Likewise apparent from FIG. 2 is the gradually reduced thickness of the end portion 156 of the sheet material 123 at its very end, which may likewise be true for the end portion 158 at the outer peripheral surface 126 of body 122.

By having the end portions 156 and 158 with tapered sections 166 and 168, respectively, a smooth winding of the sheet material 123 is provided which contributes to a full contact of adjacent layers of sheet material 123 throughout the body 122.

The tapered portion 168 of end portion 158 of the sheet material 123 at the outer peripheral surface 126 of body 122 provides for a smooth outer surface 126, not comprising any step-like recesses on that surface.

This is of importance, once the body 122 of the module 120 is hold in compression by strip-like elements 170 which serve to keep the sheet material 123 of body 122, and therefore the body 122 as a whole, in a compressed state such that bypasses from inlet channels 136 to outlet channels 140 are avoided.

The strip-like elements 170 function as compression means and are positioned on the outer peripheral surface 126 of body 122 on such disk shaped portions 146 of the body 122 which comprise the outlet channels 140. The portion 148 of the body 122 comprising the inlet channels 136 are not covered by these strip-like elements 170. Therefore the compression of the body 122 in the areas 146 comprising the outlet channels 140 is somewhat higher than in the portions 148 of body 122 accommodating the inlet channels 136. This is of some importance for avoiding bypass problems, and the fluid to be processed is forced to migrate through the sheet material 123 prior to reach the outlet channels 140 and the passage 128.

The tapered end portion 168 of the end portion 158 of the sheet material 123 helps to apply the compression force of the strip-like elements 170 around the whole outer peripheral surface 126 in an even fashion which makes sure that the body 122 has homogenous processing, e.g., filtering characteristics throughout the whole body.

A third type of channels may be provided by registering openings. These channels extend in radial directions of body and are closed at both ends thereof. The third type of channels will in numerous applications hold a particulate treatment material, but in other cases just receive the fluid from the inlet channels, allow the fluid to redistribute and pass on to the outlet channels.

Figure 3:
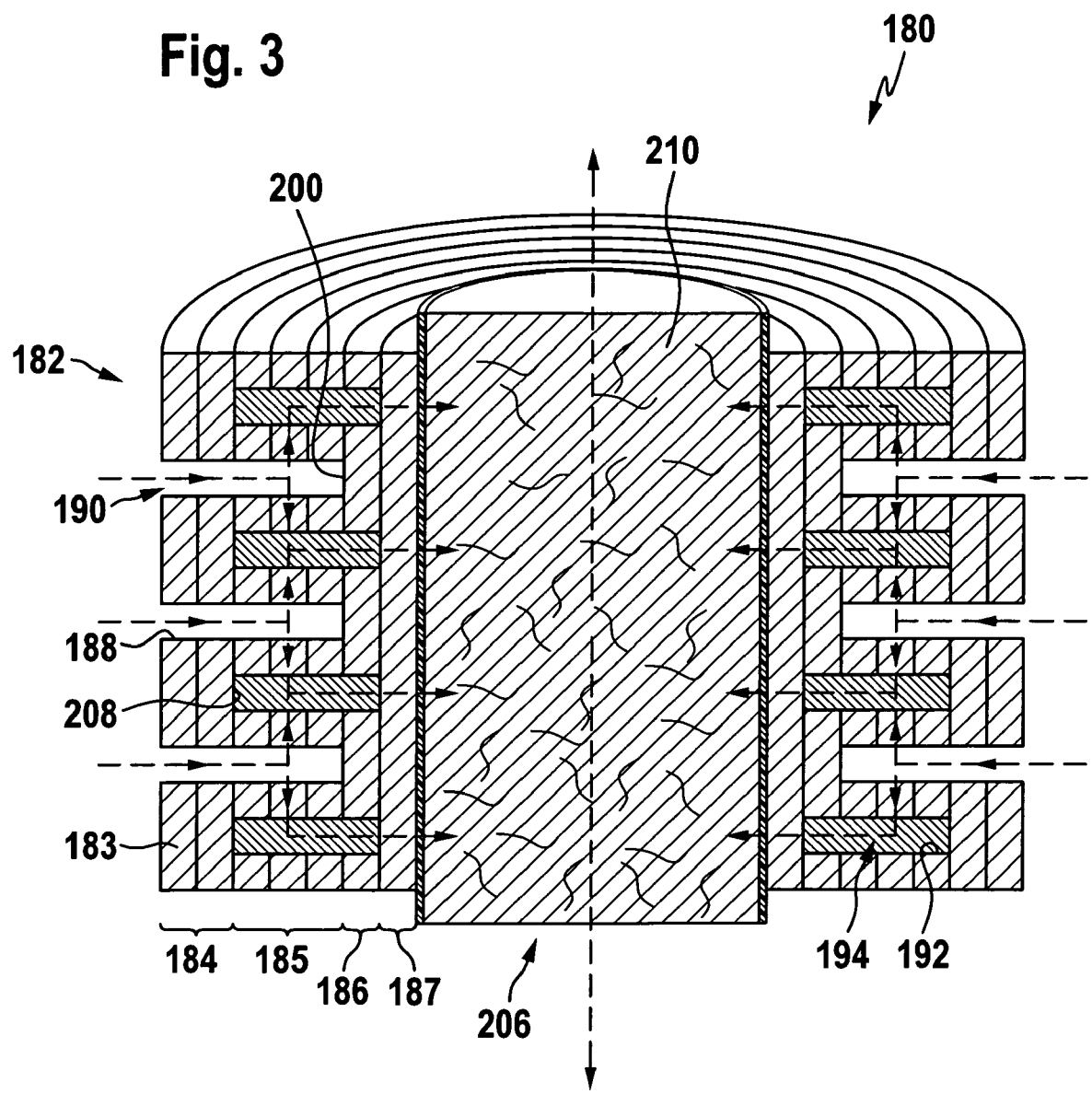
FIG. 3: a cross-sectional representation of a filter module according to a second embodiment of the present invention.

In case of the specific embodiment of an inventive module 180 shown in FIG. 3, a body 182 of windings of sheet material is roughly divided in four cylindrical portions 184, 185, 186 and 187. The outer cylindrical portion 184 of body 182 is made of one first sheet material 183 and accommodates only openings 188 forming inlet channels 190 and usually comprises two full windings of sheet material. The innermost cylindrical portion 187 of body 182 does not contain any openings and may comprise one or more layers or windings.

In between these two cylindrical portions, there is a third portion 185 which accommodates openings 188 contributing to inlet channels and openings 192 forming outlet channels 194. The sheet material making up for the fourth portion 186 has only openings 192 forming outlet channels 194 but no openings to contribute to inlet channels 190 and thus closes the ends of the inlet channels 190 directed towards the interior of module 180.

While the sheet material for the cylindrical portion 186 may be fluid impervious, the sheet material providing the innermost portion 187 must be pervious to the fluid to be processed in order to provide fluid communication of the one end of outlet channels 194 with the inner periphery of the module 180.

The inlet channels 190 are closed at their ends 200, located towards the inner peripheral surface of body 182 and not in communication with passage 206. Correspondingly, the outlet channels 194 are communicating with their ends adjacent to the inner peripheral surface with passage 206, but are closed at their opposite ends 208 towards the outer peripheral surface.

In a preferred embodiment as shown in FIG. 6, the innermost cylindrical portion 187 of body 182 is made of a sheet material which may have different filter characteristics from the sheet material used for manufacturing the outer cylindrical portion 185 of body 182. Such a configuration may be used to provide a two step filtration in one module, whereas a pre-filtration is provided by the sheet material of the outer cylindrical portion 185 of body 182. The fluid filtered therein is collected in the outlet channels 194 and is then filtered in a second step through the sheet material of the innermost cylindrical portion 187 of body 182 and collected in passage 206.

The outlet channels 194 may be filled with treatment material as will be discussed in some more detail below.

In case the outlet channels 194 are filled with a treatment material, three different processes may be performed upon one passing of the fluid through module 180, namely a pre-filtration in the course of passing the fluid from the inlet channels 190 to the outlet channels 194, a treatment of the fluid when passing through the treatment material in outlet channels 194 and a second filtration step when passing the fluid from the outlet channels 194 through the sheet material constituting the cylindrical portion 187 of body 182 prior to its collection in passage 206.

In addition, passage 206 may accommodate a candle type filter element 210 which may alternatively or additionally provide for another filtration step.

The candle type filter element 210 may be used to replace a perforated shaft as shown in connection with the embodiment of FIG. 1.

It is readily understood that if in addition treatment channels would have been provided, even more steps could be performed in one pass of the fluid through module 180.

The sheet material constituting the body of the modules described above may be a depth filter material or may be a non-porous material depending on whether the module is to work as a depth filter unit or a surface filter unit or a treatment module, except for those portions of sheet material covering the one end of the outlet channels communicating with the inner or outer periphery of the module, which always must be pervious to the fluid.

Most of the depth filter materials useful in the present invention may be compressed or deformed. The portion of deformation, which is permanent, differs depending on the depth filter material used.

Preferably, the depth filter material is not only plastically or permanently deformable, but at least partly shows elastic properties so that upon compression of the sheet material, the elastic portion of the deformation helps to keep the adjacent layers of sheet material in close contact with one another, although the surface of the sheet material may in its original state not be perfectly planar.

The preferable depth filter material used according to the present invention for providing modules for filtration applications may have different basic structures. For example, nonwoven fiber material may be used on the basis of melt blown fibers, cellulosic fibers or other naturally occurring fibers, organic or inorganic fibers, metal fibers, glass fibers, ceramic fibers, etc.

Also woven materials are possible with various fiber structures. The woven material may be monofil material, multifil material and/or multilayer material The basic materials may be cellulosic material, or other naturally occurring fibers, organic or inorganic fibers, the latter including metal fibers.

Also sintered materials may be a suitable depth filter material for use as sheet material including sintered woven materials, sintered powder materials of different structure and particle sizes, mainly made of plastic or metal.

Furthermore, foamed material of plastic or naturally occurring polymers of different structure may constitute a sheet material useful in the present invention.

Depth filter materials manufactured of the basis of cellulosic fibers may be compressed substantially, i.e., very well below about 20% of their original thickness without destroying integrity of the filter layers. The degree of maximal compression of course depends on the presence or absence of additives combined with the cellulosic fibers. Such additives may very well be incompressible and may occur in amounts of up to about 70% by weight, based on the weight of the sheet material.

Cellulose based sheet materials are well suited for the present invention. They may be compressed to a thickness of, e.g., about 12% of the original thickness, using a compression force of 2700 N. When those materials are allowed to recover a thickness of about 20% of the original thickness, the elastic force amounts, e.g., to 530 N.

Other examples of useful cellulose based sheet materials, which may be used according to the present invention as sheet material to form the body 12 may be compressed to a thickness of about 33% with a compression force of 3600 N and show a elastic force when released to a thickness of about 45% of its original thickness of 250 N.

Cellulosic material usually swells when contacted with aqueous media and in the latter example, the elastic force may be increased by the swelling effect to 310 N.

In an application where the sheet material forming body will not swell in contact with the fluid to be filtered, a somewhat higher compression will usually be used than in cases where the sheet material swells when in contact with the fluid to be filtered. This is often sufficient to ensure a safe operation of the filter module.

The invention claimed is:

1. A filter module comprising a body of wound layers of a sheet material, said body having an inner and an outer peripheral surface delimiting the body with respect to an inner and an outer periphery, respectively, a first and a second end face, a winding axis and a passage extending along the winding axis of said body and in fluid communication with said inner peripheral surface, said sheet material having a plurality of openings formed therein, said openings forming at least two types of channels within the wound layers of sheet material of said body, said channels extending in a direction from the inner peripheral surface to the outer peripheral surface, a first type of channels being in fluid communication with the outer periphery at one end and closed at the other end located towards said inner peripheral surface, a second type of channels being in fluid communication with said inner periphery and said passage at one end and closed at the other end located towards said outer peripheral surface, said channels of the one type being separated from the channels of the other type by portions of sheet material, one of said types of channels being inlet channels communicating with a fluid inlet of said filter module, the other of said types of channels being outlet channels communicating with an outlet of said filter module, said one end of the outlet channels in fluid communication with the inner or outer periphery being covered by a filter material pervious to the fluid in radial direction of said body, wherein one or more layers of the body adjacent to the outer or inner periphery provide said filter material covering the one end of the outlet channels.

2. A filter module comprising a body of wound layers of a sheet material, said body having an inner and an outer peripheral surface delimiting the body with respect to an inner and an outer periphery, respectively, a first and a second end face, a winding axis and a passage extending along the winding axis of said body and in fluid communication with said inner peripheral surface, said sheet material having a plurality of openings formed therein, said openings forming at least two types of channels within the wound layers of sheet material of said body, said channels extending in a direction from the inner peripheral surface to the outer peripheral surface, a first type of channels being in fluid communication with the outer periphery at one end and closed at the other end located towards said inner peripheral surface, a second type of channels being in fluid communication with said inner periphery and said passage at one end and closed at the other end located towards said outer peripheral surface, said channels of the one type being separated from the channels of the other type by portions of sheet material, one of said types of channels being inlet channels communicating with a fluid inlet of said filter module, the other of said types of channels being outlet channels communicating with an outlet of said filter module, said one end of the outlet channels in fluid communication with the inner or outer periphery being covered by a filter material pervious to the fluid in radial direction of said body, wherein one or more layers of the body adjacent to the outer or inner periphery provide said filter material covering the one end of the outlet channels being manufactured from a sheet material which is different from the sheet material constituting the rest of the body of wound layers.

3. The filter module of claim 2, wherein said one or more layers of the sheet material adjacent to the inner or outer periphery include a layer of a micro-porous membrane.

4. The filter module of claim 2, wherein said one or more layers adjacent the inner or outer periphery comprise a layer of pleated filter sheet material.

5. The filter module of claim 1, wherein the sheet material providing the one or more layers adjacent to the inner or outer periphery is in a compressed state.

6. The filter module of claim 5, wherein the body of wound layers of sheet material is in a compressed state, the compression of the one or more layers covering the one end of the outlet channels being higher than the compression of the layers of the rest of the body.

7. The filter module of claim 1, wherein a drainage layer is provided in between the one or more layers of filter material covering the one end of the outlet channels before the subsequent winding of sheet material of the body.

8. A filter module comprising a body of wound layers of a sheet material, said body having an inner and an outer peripheral surface delimiting the body with respect to an inner and an outer periphery, respectively, a first and a second end face, a winding axis and a passage extending along the winding axis of said body and in fluid communication with said inner peripheral surface, said sheet material having a plurality of openings formed therein, said openings forming at least two types of channels within the wound layers of sheet material of said body, said channels extending in a direction from the inner peripheral surface to the outer peripheral surface, a first type of channels being in fluid communication with the outer periphery at one end and closed at the other end located towards said inner peripheral surface, a second type of channels being in fluid communication with said inner periphery and said passage at one end and closed at the other end located towards said outer peripheral surface, said channels of the one type being separated from the channels of the other type by portions of sheet material, one of said types of channels being inlet channels communicating with a fluid inlet of said filter module, the other of said types of channels being outlet channels communicating with an outlet of said filter module, said one end of the outlet channels in fluid communication with the inner or outer periphery being covered by a filter material pervious to the fluid in radial direction of said body, wherein the outlet channels accommodate a particulate treatment material, wherein the particulate treatment material is selected from filter aids, reactive agents, absorptive agents, adsorptive agents, ion-exchange material and/or catalytic agents.

9. The filter module of claim 1, wherein the said sheet material is a depth filter material.

10. The filter module of claim 1, wherein the sheet material comprises a matrix including a compressible material and/or a material which swells in contact with the fluid to be filtered.

11. The filter module of claim 1, wherein the sheet material comprises a matrix incorporating an additive, wherein the additive is selected from filter aids, reactive agents, absorptive agents, adsorptive agents, ion-exchange material and/or catalytic agents.

12. The filter module of claim 8, wherein the treatment material is selected from kieselguhr, perlite, bentonite, activated carbon, zeolite, micro crystalline cellulose and PVPP.

13. The filter module of claim 1, wherein the sheet material comprises a matrix said matrix including organic polymer material.

14. The filter module of claim 1, wherein the inner peripheral surface of the body is supported by a hollow support member.

15. The filter module of claim 1, wherein the module comprises a candle type filter unit accommodated within the passage of the body of wound layers.

16. The filter module of claim 11, wherein the additive material is selected from kieselguhr, perlite, bentonite, activated carbon, zeolite, micro crystalline cellulose and PVPP.

17. The filter module of claim 9, wherein a drainage layer is provided in between the one or more layers of filter material covering the one end of the outlet channels before the subsequent winding of sheet material of the body.

* * * * *